Patented Feb. 26, 1929.

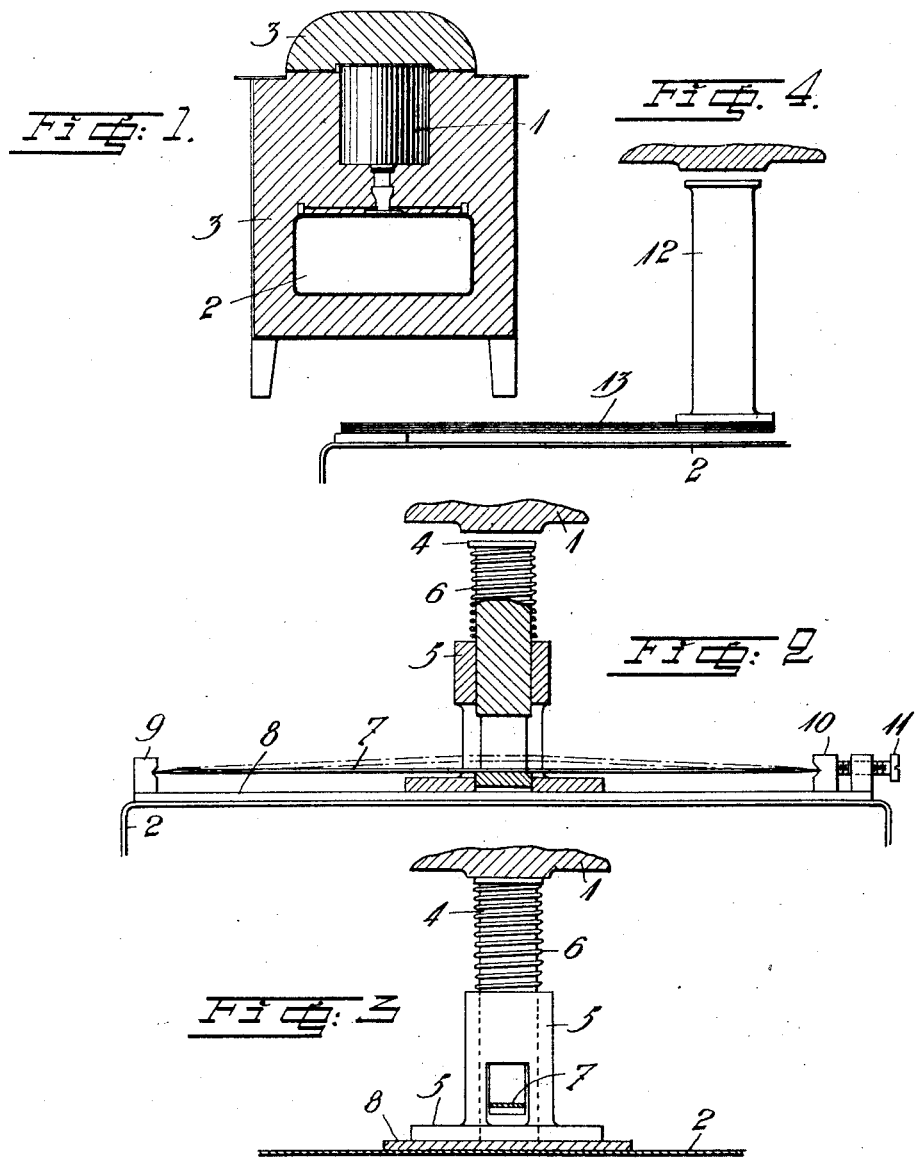

1,703,803

UNITED STATES PATENT OFFICE.

AXEL DANIEL WIDSTRÖM, OF STOCKHOLM, SWEDEN.

CONSTANT-TEMPERATURE FIRELESS COOKER.

Application filed July 8, 1927, Serial No. 204,393, and in Sweden July 19, 1926.

In fireless cookers there is frequently provided, in addition to the heat-storage element, an oven, where the foods after a first or preliminary boiling on the range are cooked to a finish without any special attention or supervision in an almost constant temperature suitable for the purpose, generally 85° to 95° C.

In order to obtain this constant temperature in the oven the heat may be supplied, for example, by an electric heating element adapted either to supply sufficient heat to make up for the loss of heat from the oven at the desired temperature, or to supply a greater degree of heat and be alternately connected with and disconnected from the oven by a thermostat located in the oven. In the case of fireless cookers heated in other ways a similar method of procedure may be used, for example a gas flame regulated by a thermostat can be used as the source of heat.

It would undoubtedly be an advantage and simplification if the necessary amount of heat could be supplied to the oven by direct heat-transference from the heat storage element of the fireless cooker. In this way the complication entailed by a special heat-source for the oven would be obviated, and the oven could, as long as the heat-store has a sufficiently high temperature for boiling etc., be kept at the necessary temperature, even when the heat supply to the cooker is disconnected, e. g. when the supply of current is shut off in the electric fireless cooker.

The present invention has for its object the provision of a thermostat device in a constant temperature fireless cooker which has not only a heat-storage element or heated element on which cooking may be done, the temperature of which is allowed to vary, but also an oven or chamber of which the temperature should be kept approximately constant, the arrangement being such that the thermostat may regulate within the requisite limits, the amount of heat conducted from the heat-storage element to the oven. When the heat conducting resistance is regulated to a minimum, the heat conducting connection between the storage element and the oven should be such that a sufficient amount of heat is supplied to the oven that the temperature of the oven will not drop below the desired point (e. g. 85° C.) even when the heat-storage element is at its lowest practicable temperature (e. g. 200° to 250°). When the heat conducting resistance is regulated to conduct to the oven the maximum amount of heat it is capable of conducting, the heat supply to the oven should not be greater than that required to maintain the temperature of the oven above the desired maximum limit (e. g. 95°) even when the temperature of the heat-storage element has risen to the highest point it may attain (e. g. 600 to 650°).

On the accompanying drawing there are shown two forms of construction of the invention.

Figure 1 is a vertical sectional view of an apparatus embodying this invention;

Figure 2 is a vertical cross section of the thermostat controller;

Figure 3 is a side elevation of the thermostat controller at a right angle to Figure 2; and Figure 4 is a view similar to Figure 2 of a modified form of thermostat controller.

In the drawings 1 is the heat-storage element, 2 the oven and 3 the heat insulation not only against the surrounding air but also between heat storage elements 1 and oven 2. In the insulation there is inserted a variable heat-conducting resistance, which is regulated by a thermostat and in which a piston or plunger 4 is movable in a guide sleeve 5, the upward movement of the piston being limited by the lower part of the heat-storage element 1. A coiled spring 6 is mounted on the piston 4 between the head of the piston and the upper end of the guide sleeve 5. When the spiral spring 6 presses the head of the piston 4 against the heat-storage element 1, heat is conducted from the heat storage element through the piston to the sleeve 5, and thence through a plate 8 to the oven 2. If the contacting surfaces fit properly together, all clearance between the various parts being slight, and if these parts are made of metal having good thermal conductivity, it is easy to make the piston 4, the guide 5 and the plate 8 in such a manner that the aforesaid minimum value of the heat conducting resistance between the heat-storage element and the oven is reached. If however the piston is moved downward against the action of the spring 6, an air-gap is provided between the head of the piston and the heat-storage element. By this means the heat conducting resistance is increased and when the piston 4 moves down a sufficient distance, it is quite possible to obtain the previously mentioned maximum value of the heat conducting resistance.

The thermostat is, in this form of construction, composed of a flat or leaf spring 7 stretched between two supports 9 and 10 attached to the plate 8. The support 10 can be displaced longitudinally of the spring 7 by means of a set-screw 11. The spring 7 passes through notches or recesses in the lower part of the piston 4 and of the sleeve 5. The plate 8 is made of a suitable metal having a high coefficient of thermal expansion (e. g. aluminum) and the spring 7 is made of a metal having a relatively low coefficient of thermal expansion (e. g. steel or nickel-steel). The aluminium plate 8 and the spring 7 have such good heat-conducting connection with the oven 2, that all these parts assume practically the same temperature. When the oven and the thermostat are at their highest permitted temperature, e. g. 95°, the spring 7 is adjusted by means of the set-screw 11 in such a way that it is approximately straight. The spring 7 then rests against the bottom of the notch in the piston 4, which by this means and in spite of the action of the spring 6 is kept in its lowest position, so that an air-gap of suitable size (e. g. 3 m/m.) occurs between the head of the piston 4 and the bottom of the heat-storage element. The spring 6 should be weak in comparison with the spring 7, so that only a slight outward bending of the spring 7 can be produced by the action of the spring 6. In this position the heat-resistance has reached its maximum, and even at the highest temperature of the heat-storage element, no more heat passes into the oven than is necessary to maintain the same at a temperature of 95°.

If the temperature in the oven drops to the lowest permitted value, of for example 85°, the plate 8 (which has the higher coefficient of expansion) contracts to a greater degree than the spring 7; so that the spring 7 is bent or bowed upwards, in which movement the piston 4 is also carried upwards by the spring 6, so that the air-gap between the head of the piston 4 and the heat-storage element 1 is reduced. By suitably dimensioning the lengths of the plate 8 and the spring 7 it is possible to cause the outward bending of the spring 7 in the event of a change of temperature from 95° to 85°, to be so great that the air-gap becomes nil, i. e. the head of the piston 4 bears against the heat-storage element. In this position the heat-resistance has reached its minimum, and consequently the heat-storage element, even at its lowest working temperature, holds sufficient heat in relation to the oven that the temperature of the latter will not drop below 85°.

Inasmuch as the change in temperature of the heat-storage element proceeds comparatively slowly, it is obvious that the thermostat, in ordinary cases, will not rapidly adjust the resistance between the extreme positions here stated. While the temperature of the heat-storage element rises slowly, for example from 250° to 600°, the temperature in the oven also rises from 85° to 95°, while at the same time the thermostat continuously causes increase in the air-gap between the head of the piston 4 and the heat storage element 1 from zero to maximum; and, vice versa, the air-gap is gradually reduced during a fall in temperature of the storage element.

The thermostat shown in Figures 2 and 3 can, in order to obtain a greater mechanical movement with a certain variation of temperature, be provided with any suitable form of transmission between the spring 7 and the piston 4. It is also possible, instead of providing a single element 7 having low thermal expansion and one element 8 having high thermal expansion, to provide several elements of each kind. Naturally it is also possible to make use of a combination of several elements and an intermediate mechanical transmission.

In place of the thermostat described, other known devices, e. g. a bimetallic strip or an expansion-vessel filled with a gas or with a fluid having a suitable boiling point, may be used either alone or in combination with a transmission mechanism. By the term thermostat there is therefore to be understood any device which reacts to changes of the temperature to which it is exposed, so as to produce a movement or change of form which can be used for the purpose described. The thermostat might also be arranged to be influenced by the temperature in the heat-storage element, instead of by the temperature in the oven or the like.

Another form of heat-resistance is indicated in Figure 4. In this case a bolt 12, made of metal having good heat conducting capacity, e. g. copper, is mounted at one end of a highly flexible and heat conducting spring plate 13 (composed for example of several thin copper strips) which at its other end is attached to the oven. By a thermostat (not shown), for example of the kind already described, the said bolt is raised into contact with the heat-storage element 1 when the temperature in the oven has a tendency to drop, and is moved away from the heat-storage element when the temperature in the oven tends to rise. The plate might be made from a bi-metallic element of known kind, so that a separate thermostat becomes superfluous.

In the fireless cooker there can be provided, in addition to the oven, other spaces or chambers which it is desired to keep at an almost constant temperature, for example a chamber with a lower temperature than the oven (e. g. 60° to 70°) intended for keeping warm ready-cooked dishes; these also may be kept at a suitable temperature by means of a device of the same kind as that used for the oven.

What I claim is:

1. In a fireless cooker, a heat storing element having a surface adapted to serve as a cooking-plate, an insulated oven, and thermostatically controlled means between said heat-storing element and said oven for conducting heat from the heat-storing element to the oven and operative to maintain the temperature of the oven approximately constant regardless of the variations of the temperature of the heat storing element.

2. A fireless cooker including an oven, an insulated body surrounding said oven, a heat-storing element associated with said insulated body, and a thermostatically controlled heat-conducting medium between the heat-storing element and the oven controlled by the temperature within the oven to regulate the transfer of heat from the heat-storing element to the oven.

3. A fireless cooker according to claim 2 in which the thermostatically controlled heat-conducting medium includes a member movable into contact with the heat-storing element when the temperature of the oven is below a predetermined point and movable out of contact with said element when the temperature of said oven is above such point.

In testimony whereof, I have signed my name to this specification at Stockholm, Sweden, this 20th day of June, 1927.

AXEL DANIEL WIDSTRÖM.